United States Patent
Germano et al.

(10) Patent No.: US 8,770,361 B2
(45) Date of Patent: Jul. 8, 2014

(54) RESIDUAL PRESSURE HOLDING VALVE AND SUSPENSION STRUT

(75) Inventors: Francesco Germano, Bietigheim-Bissingen (DE); Steffen Lang, Simmozheim (DE); Claus Blattner, Oberderdingen (DE); Thomas Sprengel, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 449 days.

(21) Appl. No.: 13/096,481

(22) Filed: Apr. 28, 2011

(65) Prior Publication Data

US 2011/0278775 A1    Nov. 17, 2011

(30) Foreign Application Priority Data

May 14, 2010    (DE) .......................... 10 2010 020 524

(51) Int. Cl.
*F16F 9/56* (2006.01)
(52) U.S. Cl.
USPC ................ 188/282.7; 267/64.17; 188/282.8
(58) Field of Classification Search
USPC ........... 137/115.26, 538; 251/337; 267/64.15, 267/64.23, 120; 188/282.7, 282.8
See application file for complete search history.

(56) References Cited

U.S. PATENT DOCUMENTS

| | | | |
|---|---|---|---|
| 2,865,396 A * | 12/1958 | Focht .......................... | 137/493.3 |
| 3,353,816 A * | 11/1967 | Axthammer et al. ...... | 267/64.16 |
| 3,581,850 A * | 6/1971 | Jaitl ........................... | 188/282.7 |
| 3,904,183 A * | 9/1975 | Allinquant et al. ........ | 267/64.17 |
| 4,185,719 A * | 1/1980 | Farris et al. ................. | 188/33 |
| 4,280,529 A | 7/1981 | Silvestri | |
| 4,535,806 A | 8/1985 | Ottung | |
| 4,779,560 A | 10/1988 | Patrick et al. | |
| 4,826,094 A * | 5/1989 | Whiteley .................. | 242/485.9 |
| 5,183,075 A | 2/1993 | Stein | |
| 6,173,738 B1 | 1/2001 | Opara et al. | |
| 6,354,617 B1 | 3/2002 | Behmenburg et al. | |
| 8,360,096 B2 * | 1/2013 | Courtright et al. ........... | 137/492 |
| 2002/0060111 A1 * | 5/2002 | Vignocchi et al. ....... | 188/322.19 |
| 2009/0095563 A1 | 4/2009 | Parsch | |

FOREIGN PATENT DOCUMENTS

| | | |
|---|---|---|
| DE | 198 54 540 | 6/2000 |
| DE | 199 18 157 | 10/2000 |
| DE | 102004026683 | 12/2005 |
| JP | 8118938 | 5/1996 |
| JP | 2000-199577 | 7/2000 |
| JP | 2000199577 | 7/2000 |
| JP | 2001329925 | 11/2001 |

* cited by examiner

*Primary Examiner* — Christopher Schwartz
(74) *Attorney, Agent, or Firm* — Gerald E. Hespos; Michael J. Porco; Matthew T. Hespos (57) ABSTRACT

A residual pressure holding valve (1) for a hydropneumatic suspension strut (2) of a motor vehicle has a valve housing (3) with an air inlet (4) and an air outlet (5). A valve body (6) is arranged displaceably in the valve housing (3) and a valve element (7) is arranged displaceably in the valve body (6). Air pressure applied to the air inlet (4) can lift the valve body (6) off a valve body seat (8) of the valve housing (3) to allow air to flow past the valve body (6) to the air outlet (5). Air pressure applied to the air outlet (5) can lift the valve element (7) off a valve element seat (9) of the valve body (6) to allow air to flow past the valve element (7) to the air inlet (4).

18 Claims, 7 Drawing Sheets

RESIDUAL PRESSURE HOLDING VALVE AND SUSPENSION STRUT

CROSS REFERENCE TO RELATED APPLICATION

This application claims priority under 35 USC 119 to German Patent Application No 10 2010 020 524.9 filed on May 14, 2010, the entire disclosure of which is incorporated herein by reference.

BACKGROUND OF THE INVENTION

1. Field of the Invention

The invention relates to a residual pressure holding valve and to a suspension strut with such a residual pressure holding valve, in particular for a motor vehicle.

2. Description of the Related Art

The invention can be applied to any vehicle, but will explained in detail, along with the problems on which it is based, with respect to a passenger motor vehicle.

Hydropneumatic suspension systems in motor vehicles permit the spring system to be adapted in a convenient, fast and versatile fashion to conditions of the roadway, the payload of the motor vehicle and/or the driving properties of the chassis of the motor vehicle desired by a vehicle driver. The spring effect of such a suspension system is ensured by gas-filled spring bellows, and the gas pressure within the spring bellows can be adjusted using, for example, a compressor. Pressure holding valves are used to maintain the functional capability of the spring system in the event of a pressure loss, for example due a failure of the compressor or a leak in the pneumatic system. The pressure holding valve prevents air from being able to flow out of the spring bellows. A sufficient residual holding pressure therefore always is maintained in the spring bellows.

DE 198 54 540 C2 describes such a pressure holding valve. The pressure holding valve has a pump-end housing component and a consumer-end housing component that are plugged into one another in certain sections and that have an inflow and an outlet. A flexible rubber diaphragm is arranged between the housing components to separate the inflow from the outlet in a gastight fashion. A diaphragm face of the rubber diaphragm is loaded with the air pressure when an air pressure is applied to the inflow. As a result, a sealing face of the diaphragm is lifted from a valve seat of the pump-side housing component counter to the force of a valve spring. The operating pressure may drop below a threshold value predetermined by the valve spring if, for example, the pumping capacity of the compressor drops. As a result, the sealing face of the diaphragm comes to rest again on its valve seat However, the housing components of this arrangement are very complex and costly to fabricate, and the presetting of the residual holding pressure by the valve spring, which acts counter to the inflow air pressure, only can be adjusted very imprecisely.

The present invention therefore is based on the object of providing an improved residual pressure holding valve that eliminates the abovementioned disadvantages.

SUMMARY OF THE INVENTION

The invention relates to a residual pressure holding valve for a hydropneumatic suspension strut of a motor vehicle. The residual pressure holding valve has a valve housing with an air inlet and an air outlet. A valve body is arranged displaceably in the valve housing and a valve element which is arranged displaceably in the valve body. The valve body is connected operatively to the valve housing in such a way that the valve body can be lifted off a valve body seat of the valve housing when an air pressure is applied to the air inlet so that air can flow past the valve body to the air outlet. The valve element is connected operatively to the valve body in such a way that the valve element can be lifted off a valve element seat of the valve body when an air pressure is applied to the air outlet so that air can flow past the valve element to the air inlet.

The invention also relates to a suspension strut, in particular a hydropneumatic suspension strut for a motor vehicle, having such a residual pressure holding valve.

A basic idea of the invention is to provide a residual pressure holding valve with a valve body for controlling the air throughflow from the air inlet to the air outlet of the valve housing, and a valve element for controlling the air throughflow from the air outlet to the air inlet of the valve housing. This permits precise adjustability of the residual holding pressure solely through the structural configuration of the valve element and of the valve element seat. Furthermore, the individual parts of the residual pressure holding valve are structurally simple compared to the above-described prior art residual pressure holding valves, and therefore are less costly to manufacture.

The valve body is lifted off the valve body seat of the valve housing when an air pressure above a predetermined valve body threshold value is applied to the air inlet, wherein an air inlet pressure applied to the air inlet is higher than an air outlet pressure applied to the air outlet. Thus, the residual pressure holding valve reliably opens in the direction from the air inlet to the air outlet when there is a defined air pressure at the air inlet.

The valve element is lifted from the valve element seat of the valve body when an air pressure above a predetermined valve element threshold value is applied to the air outlet, wherein an air outlet pressure applied to the air outlet is higher than an air inlet pressure applied to the air inlet. This ensures that the residual pressure holding valve is opened to allow air to flow through from the air inlet to the air outlet if an air outlet pressure is higher than the air inlet pressure and higher than the predetermined valve element threshold value.

The valve element preferably is a ball that is spring-prestressed in the direction of the air outlet. Thus, the valve element can be manufactured in a way that is structurally simple and cost-effective.

The valve body preferably has a stepped cylindrical breakthrough for holding the ball and a first cylinder spring that spring-prestresses the ball in the valve body in the direction of the air outlet. The stepped cylindrical breakthrough provides reliable and secure axial guidance for the ball in the valve body. Furthermore, the cylinder spring provides a cost-effective easily manufactured means for spring-prestressing the ball in the direction of the air outlet. As a result, the manufacturing costs for the residual pressure holding valve are reduced.

The valve element seat preferably has a hemispherical shape for reliably ensuring that the valve element seat is sealed by the ball. This increases the reliability of the residual pressure holding valve.

The valve body preferably is a cylinder that is spring-prestressed against the air inlet and has a planar valve face. Thus, the valve body can be manufactured in a simple and cost-effective way, thereby reducing manufacturing costs of the residual pressure holding valve.

A second cylinder spring preferably is provided between an end wall of the valve housing and a shoulder of the valve body and surrounds at least in certain sections of the valve body. The second cylinder spring spring-prestresses the valve body in the valve housing in the direction of the air inlet. The selection of the spring hardness of the second cylinder spring permits the valve body threshold value to be adjusted conveniently. The use of a cost-effective cylinder spring for pre-stressing the valve body in the direction of the air inlet reduces the production costs of the residual pressure holding valve.

The cylinder springs preferably are arranged coaxially with respect to one another and the second cylinder spring surrounds the first cylinder spring at least in certain sections. The cylinder springs have different spring hardness values, and the spring forces of the cylinder springs act in opposite directions. Thus, the cylinder springs can be accommodated in a small installation space. Additionally, the valve body threshold value and the valve element threshold value can be adjusted precisely through the use of springs with different spring hardness values.

The valve body seat preferably has a planar face that permits a reliable and gas-tight seat of the valve body on the valve body seat with increased reliability of the residual pressure holding valve.

Ann O ring preferably is arranged between the valve body and the valve body seat of the valve housing. This reliably prevents undesired flowing of air through the residual pressure holding valve in a closed state.

The valve housing preferably is a hollow cylinder shape. The valve body is guided axially with an outer wall on an inner wall of the valve housing and is centered with respect to the valve body seat. This reliably prevents the valve body from tilting during axial displacement in the valve housing, which increases the operational safety and the reliability of the residual pressure holding valve.

The valve housing preferably has ducts that run axially on an inner wall and are embodied in such a way that when the valve body is displaced axially the ducts can be opened at least in certain sections to allow air to flow past the valve body. This ensures that a sufficiently large volume flow flows through the residual pressure holding valve, which extends the possible uses of the residual pressure holding valve.

The residual pressure holding valve preferably is integrated into a spring bellows of the suspension strut. This reduces the necessary installation space of the suspension strut, which extends the range of use thereof.

The invention will be explained in more detail below on the basis of exemplary embodiments and with reference to the accompanying schematic figures in the drawing.

BRIEF DESCRIPTION OF THE DRAWINGS

The same reference symbols are used in the figures to denote identical or functionally identical components unless stated otherwise.

DETAILED DESCRIPTION OF THE PREFERRED EMBODIMENTS

Figure 1:
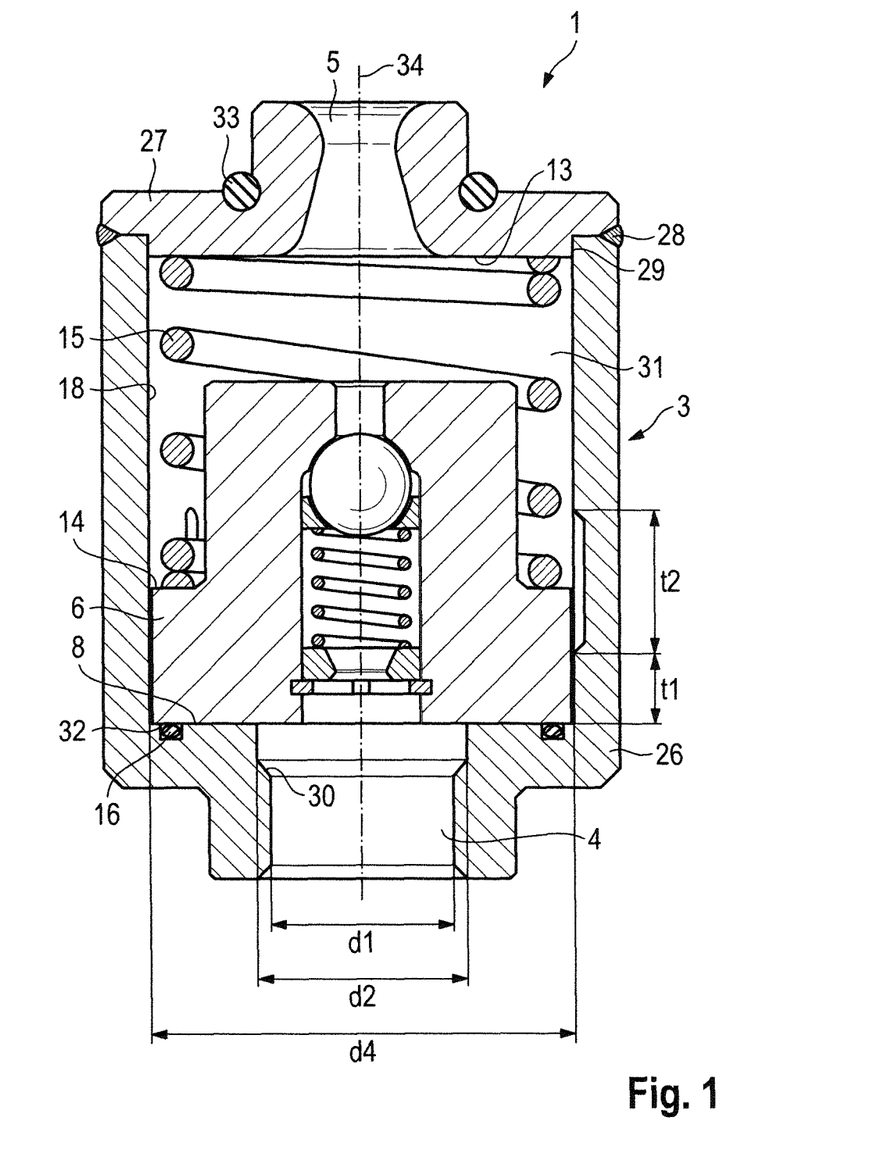
FIG. 1 is a sectional view of a residual pressure holding valve according to a preferred embodiment of the present invention.

FIG. 1 illustrates a residual pressure holding valve 1 for a hydropneumatic suspension strut of a motor vehicle. The residual pressure holding valve 1 has a valve housing 3 in the shape of a hollow cylinder with an air inlet 4 and an air outlet 5. The valve housing 3 is composed, for example, of a bowl-shaped lower part 26 and a cover 27 that terminates the bowl-shaped lower part 26. The air inlet 4 is in the lower part 26, and the air outlet 5 is in the cover 27. The components 26, 27 are welded to one another in a gastight fashion at a seam 28. In alternative embodiments of the valve housing, the components 26, 27 can, for example, be screwed or adhesively bonded to one another. The cover 27 is guided centrally along an inner wall 18 of the valve housing 3 by means of a collar 29, for example. In other embodiments the valve housing 3, for example, can be constructed from more than two components. The air inlet 4 is a stepped bore in the form of a pneumatic quick-release coupling. A first diameter $d_1$ of the air inlet 4 merges with a relatively large second diameter $d_2$. The transition between the two diameters $d_1$, $d_2$ is embodied, for example, as a chamfer 30.

The valve housing 3 has a substantially cylindrical interior 31 bounded by the inner wall 18 and two end walls 8, 13. The end wall 13 has the air outlet 5 in the form of a conical drilled hole oriented so that the tip of the cone of the air outlet 5 points away from the interior 31 into the outer region of the valve housing 3. The end wall 8 has the air inlet 4 and defines a planar valve body seat 8 that preferably is polished. An annular groove 32 is formed in the valve body seat 8 outward of the air inlet 4 and accommodates an O ring 16. The air inlet and the air outlet 4, 5 define connecting devices 4, 5 for connecting air lines, and preferably define quick release couplings. A sealing device 33 in the form of an O ring preferably surrounds the air outlet 5 to connect the air outlet 5 in an airtight fashion. Such a sealing device also can be provided on the air inlet 4. The air outlet 5 can be connected directly to a spring bellows of a hydropneumatic suspension strut.

Figure 2:
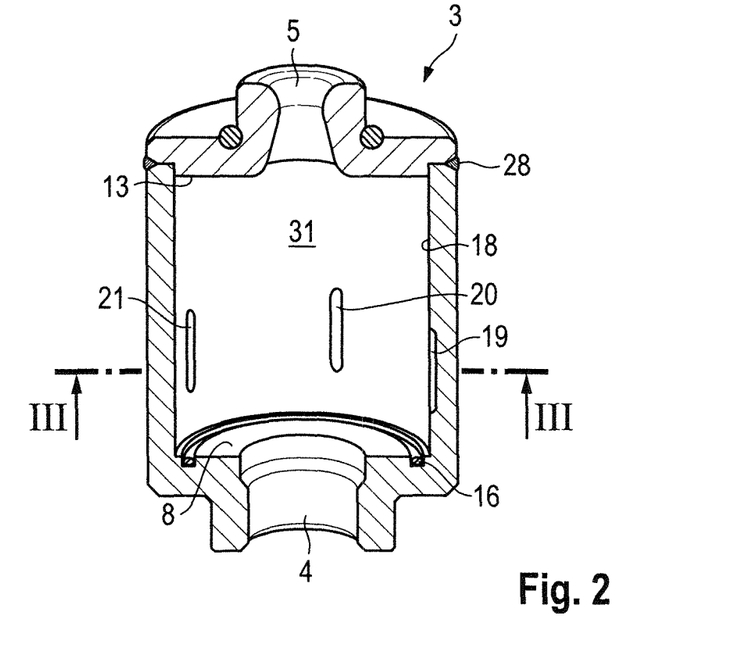
FIG. 2 is a perspective sectional view of a valve housing of the preferred embodiment of the residual pressure holding valve according to FIG. 1.
Figure 3:
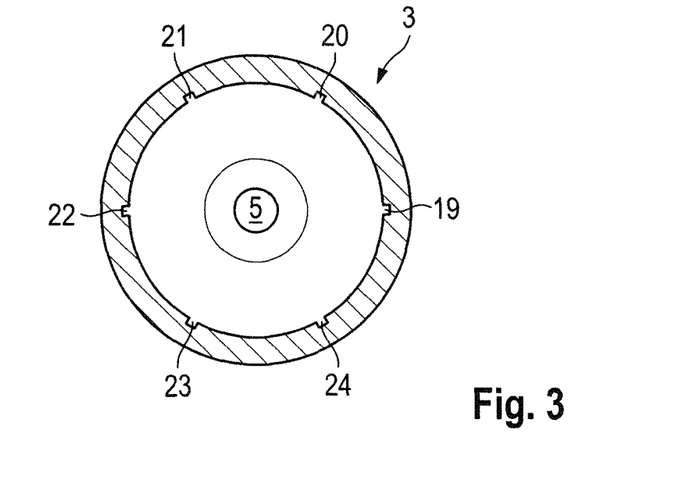
FIG. 3 is a sectional view taken along line III-III in FIG. 2.

Ducts 19-24 are provided on the inner wall 18 of the valve housing 3 and run parallel to a central axis 34 of the valve housing 3 at uniform distances from one another, as illustrated in FIGS. 2 and 3. The ducts 19-24 are spaced a distance $t_1$ from the valve body seat 8 and have a length $t_2$. Six ducts 19-24 are illustrated in FIG. 3, but more or fewer than six ducts 19-24 may be provided.

Figure 4:
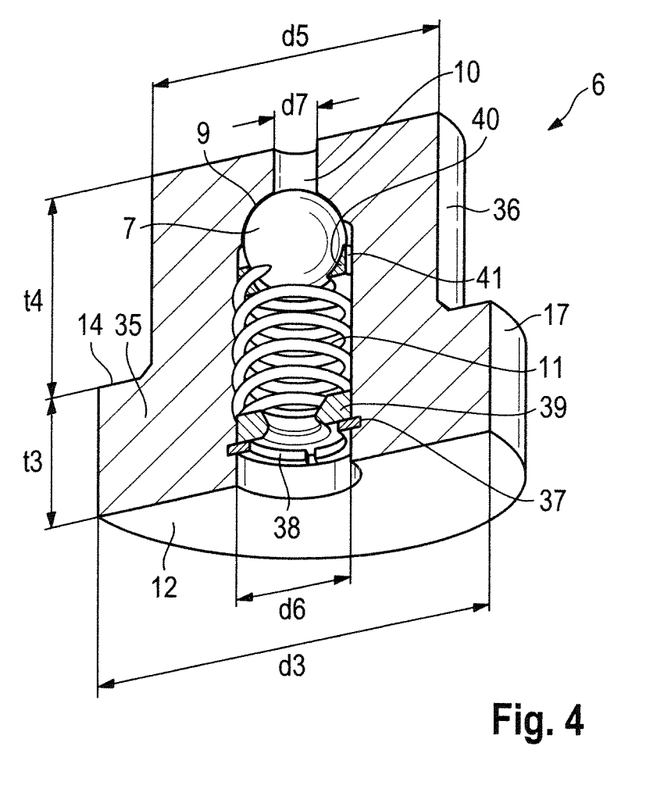
FIG. 4 is a perspective sectional view of a valve body in the preferred embodiment of the residual pressure holding valve according to FIG. 1.

The residual pressure holding valve 1 also has a valve body 6 that is arranged displaceably in the valve housing 3. The valve body 6 has a stepped cylindrical shape with first and second concentric cylinder sections 35 and 36, as shown in FIG. 4. The first cylindrical section 35 has an outer wall 17 with diameter $d_3$ that corresponds approximately to a diameter $d_4$ of the interior 31 of the valve housing 3. The diameters $d_3$, $d_4$ are selected so that the outer wall 17 is guided axially without play on the inner wall 18 with respect to the center line 34 of the valve housing 3. A height $t_3$ of the first cylinder section 35 is less than the length $t_2$ of the ducts 19-24. An end face 12 of the valve body 6 at the first cylinder section 35 defines a planar valve face 12 facing the valve body seat 8 of the valve housing 3. The second cylinder section 36 of the valve body 6 is arranged on an end face of the cylinder section 35 facing away from the valve face 12. The second cylinder section 36 has a height t4 and a diameter d5 that is smaller than the diameter d3.

The guidance of the outer wall 17 of the valve body 6 on the inner wall 18 of the valve housing 3 centers the valve seat 12 with respect to the valve body seat 8 of the valve housing 3.

A step-shaped breakthrough 10 is provided centrally in the valve body 6 for holding a valve element 7 and a first cylinder spring 11. The breakthrough 10 has a valve element seat 9 for the valve element 7. The valve element seat 9 preferably has a concave hemispherical shape and the valve element 7 preferably is a ball 7, in particular a steel ball 7. The ball 7 is adapted to the valve element seat 9 of the valve body 6 so that the breakthrough 10 can be closed off in a gastight fashion by the ball 7.

The breakthrough 10 extends from the valve face 12 of the valve body 6 with a diameter d6 for approximately ⅘ of an axial length of the valve body 6 and then reduces to a diameter d7 from the valve element seat 9 to the end of the valve body 6 opposite the valve face 12. The breakthrough 10 has an annular groove 37 in which a circlip 38 is arranged. A securing ring 39 bears against the circlip 38 and the first cylinder spring 11 bears against the securing ring 39. A ball receptacle 40 is provided between the first cylinder spring 11 and the ball 7. The ball 7 therefore is spring-prestressed against the circlip 38 via the ball receptacle 40, the first cylinder spring 11 and the securing ring 39. The ball 7 therefore is spring-prestressed against the air outlet 5 of the valve housing 3. Four grooves 41 are arranged uniformly over an outer face of the ball receptacle 40, but just one groove 41 is shown in FIG. 4 for the sake of simplification.

The valve body 6 has a shoulder 14 defined by the end face of the first cylinder section 35 facing away from the valve face 12. The residual pressure holding valve 1 also has a second cylinder spring 15 surrounding the second cylinder section 36 of the valve body 6 and arranged between the end face 13 of the valve housing 3 and the shoulder 14 of the valve body 6. The second cylinder spring 15 is arranged to spring-prestress the valve body 6 against the air inlet 4 of the valve housing 3. The diameter d5 of the cylinder section 36 is selected so that the second cylinder spring 15 is radially freely movable between the inner wall 18 of the valve housing 3 and the second cylinder section 36 of the valve body 6 when the spring 15 is compressed, and touches neither the inner wall 18 nor the cylinder section 36.

The cylinder springs 11, 15 are arranged coaxially with respect to one another and the second cylinder spring surrounds the first cylinder spring 11 at least in certain sections. The cylinder springs 11, 15 preferably have different spring hardness values, with the spring hardness of the second cylinder spring 15 preferably being greater than the spring hardness of the first cylinder spring 11. The spring forces of the cylinder springs 11, 15 act in opposite directions. The spring force of the first cylinder spring 11 points in the direction of the air outlet 5 of the valve housing 3, and the spring force of the second cylinder spring 15 points in the direction of the air inlet 4 of the valve housing 3. The spring hardness of the second cylinder spring 15 is selected so that the valve body 6 is not lifted off the valve body seat 8 of the valve housing 3 when an air pressure is applied to the air inlet 4 of the valve housing 3 until the air pressure applied to the air inlet 4 is above a predetermined valve body threshold value.

Furthermore, the spring hardness of the first cylinder spring 11 is configured in so that the valve element 7 is not lifted off the valve element seat 9 of the valve body 6 until an air pressure above the predetermined valve element threshold value is applied to the air outlet 5 of the valve housing. In the illustration of the residual pressure holding valve 1 in FIG. 1, neither the valve body threshold value nor the valve element threshold value is exceeded. This means that the residual pressure holding valve 1 is closed and is in an initial state.

Figure 5:
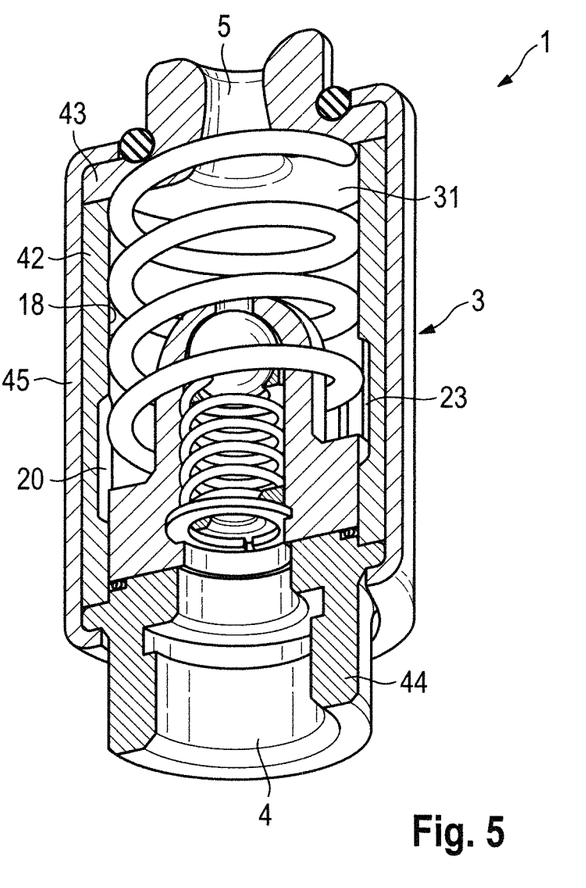
FIG. 5 is a perspective sectional view of the residual pressure holding valve in an initial state.

The method of functioning of the residual pressure holding valve 1 will be explained below. FIG. 5 shows the closed residual pressure holding valve 1 of a further embodiment variant of the valve housing 3. The valve housing 3 has a tubular section 42 with the ducts 19-24 on its inner wall 18. The inner wall 31 of the valve housing 3 is closed off by two covers 43, 44 on the side of the air inlet 4 and the side of the air outlet 5. The covers 43, 44 and the tubular section 42 are arranged in a housing casing 45 of the valve housing 3 that surrounds end faces of the covers 43, 44 that point away from the interior 31 of the valve housing 3. For this purpose, the housing casing 45 is, for example, crimped over the covers 43, 44.

Figure 6:
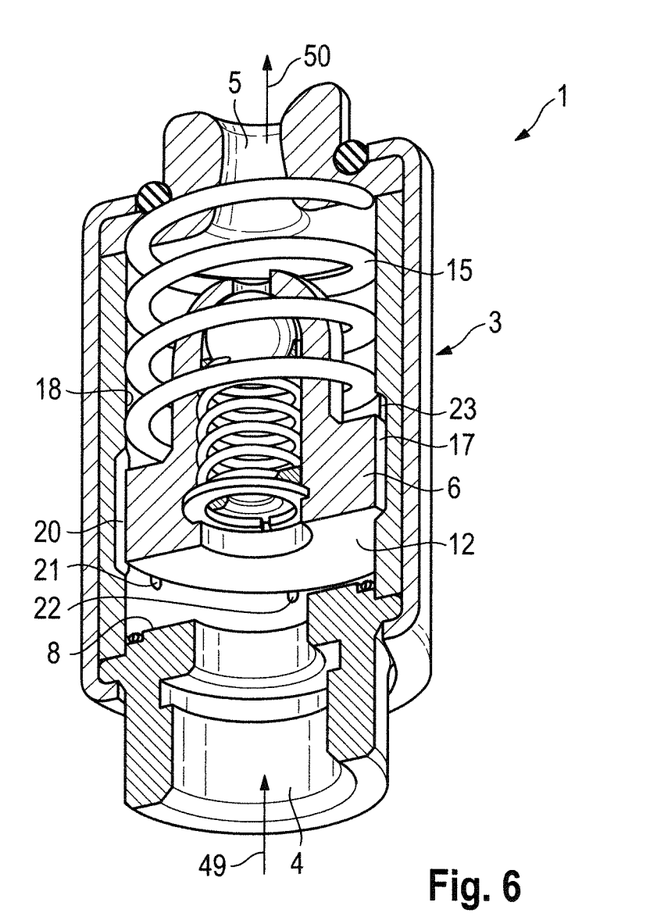
FIG. 6 is a perspective sectional view of the residual pressure holding valve in a first operating state.

FIG. 6 illustrates the residual pressure holding valve 1 in an operating state in which a pressure applied to the air inlet is higher than a pressure applied to the air outlet 5, and the pressure applied to the air inlet is above the valve body threshold value which is predetermined by the second cylinder spring 15. In this operating state, the valve body 6 is lifted off the valve body seat 8 counter to the spring-prestress of the second cylinder spring 15, and is displaced axially toward the air outlet 5 of the valve housing 3. In this context, the outer wall 17 of the valve body 6 slides along the inner wall 18 of the valve housing 3. The valve face 12 of the valve body 6 is lifted off the valve body seat 8 until air can flow past the valve body 6 through the ducts 19-24. The cross sections of the ducts 19-24 are configured for maximum transmission of air. The height t3 of the cylinder section 35 of the valve body 6 and the length t2 of the ducts 19-24 are matched to one another so that in the case of axial displacement of the valve body 6 along the ducts 19-24 end sections of the ducts 19-24 are exposed in the axial direction on both sides of the cylinder section 35 of the valve body 6. In this operating state of the residual pressure holding valve 1, air flows from the air inlet 4 to the air outlet 5 of the valve housing 3, as indicated by the arrows 49, 50. The air pressure at the air inlet 4 is higher than the air pressure at the air outlet 5. The valve body 6 moves again toward the valve body seat 8, if the air pressure on the air inlet 4 side drops until the predetermined valve body threshold value is undershot and the airstream is interrupted by the ducts 19-24.

Figure 7:
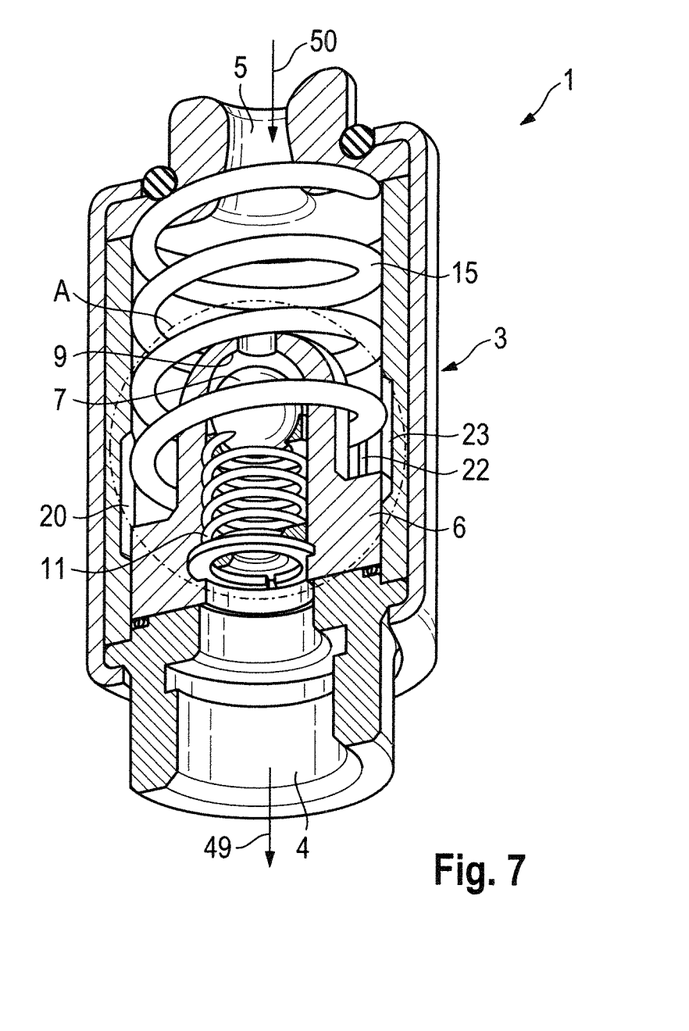
FIG. 7 is a perspective sectional view of the residual pressure holding valve in a second operating state.
Figure 8:
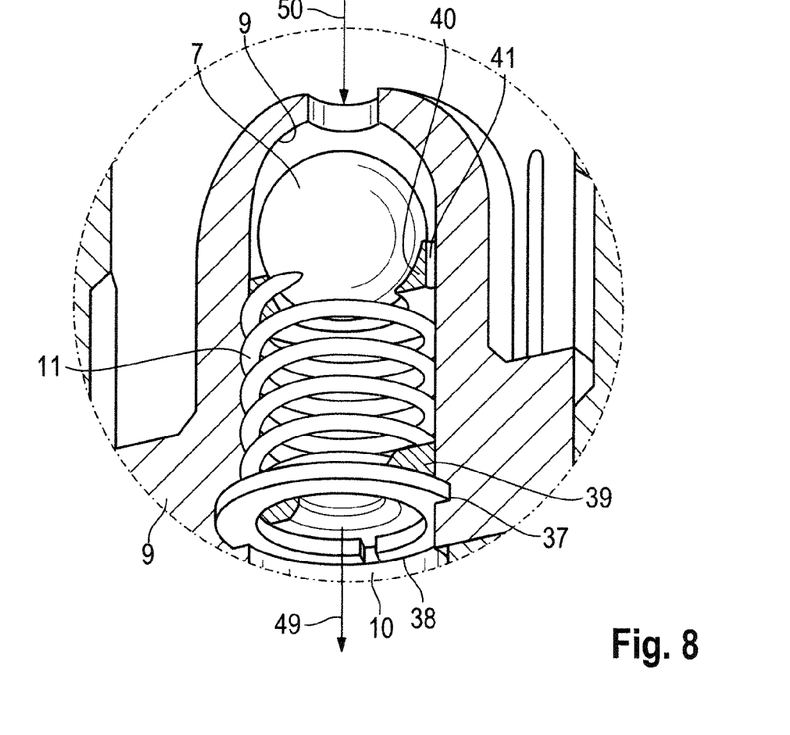
FIG. 8 is an enlarged view of the residual pressure holding valve according to the view of a detail A in FIG. 7.

FIGS. 7 and 8 show the residual pressure holding valve 1 in a second operating state. FIG. 8 shows the detail A from FIG. 7. If the pressure on the air inlet 4 side of the valve housing 3 drops significantly, for example due to a defect in an air hose, the second cylinder spring 15 presses the valve body 6 against the valve body seat 8. The ducts 19-24 then are closed. If a pressure at the air outlet 5, for example a residual pressure of a spring bellows of a hydropneumatic suspension system, is higher than the predetermined valve element threshold value, the valve element 7 is lifted off its valve element seat 9 and air flows past the ball 7 through the grooves 41 of the ball receptacle 40 and the breakthrough 10 to the air inlet 4 of the valve housing 3, as is illustrated by the arrows 49, 50. In this operating state, an air outlet pressure at the air outlet 5 is higher than an air inlet pressure at the air inlet 4. As a result, air flows from the air outlet 5 to the air inlet 4 of the valve housing 3.

Figure 9:
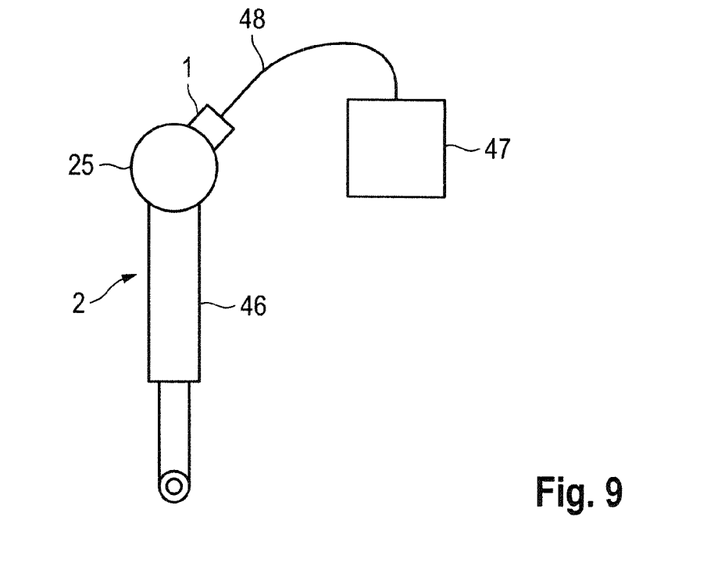
FIG. 9 is an exemplary application of the residual pressure holding valve.

FIG. 9 illustrates an exemplary application of the residual pressure holding valve 1. A suspension strut 2, namely a hydropneumatic suspension strut 2, has a damper 46 and a spring bellows 25. Pressure can be applied to the spring bellows 25 by a compressor 47, for example. The compressor 47 is connected via an air hose 48 to the spring bellows 25. The residual pressure holding valve 1 is connected between the air hose 48 and the spring bellows 25. For this purpose, the residual pressure holding valve 1 is arranged, for example, directly on the spring bellows 25 or is connected thereto by a further air hose. To ensure a defined residual pressure in the spring bellows 25 in the event of failure of the compressor 47 or the air hose 48 being possibly torn off, the valve element threshold value of the valve element 7 can be adjusted by a selection of the spring hardness of the first cylinder spring 11 so that a defined residual pressure is maintained in the spring bellows 25.

By means of the residual pressure holding valve 1 it is therefore possible to maintain a predefined residual pressure in the spring bellows 25 conveniently and reliably even in the event of a defect in the pneumatic system.

What is claimed is:

1. A residual pressure holding valve for a hydropneumatic suspension strut of a motor vehicle, comprising:
    a valve housing with a substantially hollow cylindrical tubular side wall having opposite first and second ends, a valve body seat extending transversely across the side wall at the first end thereof, an end wall extending transversely across the side wall at the second end thereof, an air inlet in the valve body seat, an air outlet in the end wall, and ducts extending axially along an inner surface of the side wall and being spaced from the valve body seat;
    a valve body arranged displaceably in the valve housing and having an outer surface guided axially on the inner wall surface of the side wall of the valve housing and being centered with respect to the valve body seat for movement from a closed position where the valve body is engaged with the valve body seat and with the inner surface of the side wall between the valve body seat and the ducts and an open position where the valve body is spaced sufficiently from the valve body seat to permit air communication from the air inlet to the ducts, a breakthrough extending axially through the valve element and having a valve element seat facing the air inlet;
    a valve element arranged displaceably in the breakthrough of the valve body and being sealingly engageable with the valve element seat;
    a first spring in the breakthrough of the valve body and biasing the valve element against the valve element seat in the valve body; and
    a second spring in the valve housing and biasing the valve body against the valve body seat,
    wherein the valve body is connected operatively to the valve housing so that when an air pressure is applied to the air inlet, the valve body can be lifted off a valve body seat of the valve housing to allow air to flow past the valve body to the air outlet and wherein the valve element is connected operatively to the valve body so that when an air pressure is applied to the air outlet, the valve element can be lifted off a valve element seat of the valve body to allow air to flow past the valve element to the air inlet.

2. The residual pressure holding valve of claim 1, wherein the valve body is lifted off the valve body seat of the valve housing when an air pressure above a predetermined valve body threshold value is applied to the air inlet, and when an air inlet pressure applied to the air inlet is higher than an air outlet pressure applied to the air outlet.

3. The residual pressure holding valve of claim 2, wherein the valve element is lifted from the valve element seat of the valve body when an air pressure above a predetermined valve element threshold value is applied to the air outlet and when an air outlet pressure applied to the air outlet is higher than an air inlet pressure applied to the air inlet.

4. The residual pressure holding valve of claim 1, wherein the valve element is a ball that is spring-prestressed toward the air outlet.

5. The residual pressure holding valve of claim 4, wherein the breakthrough in the valve body is a stepped cylindrical breakthrough for holding the ball, and the first spring spring-prestresses the ball in the valve body toward the air outlet.

6. The residual pressure holding valve of claim 5, wherein the springs are arranged coaxially with respect to one another, the second spring surrounding at least a section of the first spring, the springs having different spring hardness values, and spring forces of the springs acting in opposite directions.

7. The residual pressure holding valve of claim 4, wherein the valve body comprises a cylinder that is spring-prestressed against the air inlet and that has a planar valve face.

8. The residual pressure holding valve of claim 7, the second spring extends between the end wall of the valve housing and a shoulder of the valve body, the second spring surrounding at least part of the valve body and spring-prestressing the valve body in the valve housing toward the air inlet.

9. The residual pressure holding valve of claim 4, wherein the valve element seat has a concave hemispherical shape.

10. The residual pressure holding valve of claim 1, wherein the valve body seat has a planar face.

11. The residual pressure holding valve of claim 1, further comprising a sealing device between the valve body and the valve body seat of the valve housing.

12. A hydropneumatic suspension strut for a motor vehicle, having the residual pressure holding valve of claim 1.

13. The suspension strut of claim 12, wherein the residual pressure holding valve is integrated into a spring bellows of the suspension strut.

14. A residual pressure holding valve for a hydropneumatic suspension strut of a motor vehicle, comprising:
    a valve housing with a substantially hollow cylindrical tubular side wall, ducts running axially on an inner surface of the side wall, the valve housing further having an air inlet, an air outlet and a valve body seat surrounding the air inlet;
    a valve body arranged axially displaceably in the valve housing, the valve body having an outer surface guided axially in the hollow cylindrical tubular sidewall and being centered with respect to the valve body seat, the valve body having a valve face engageable with the valve body seat to seal the air inlet, a shoulder facing away from the valve face and a stepped cylindrical breakthrough extending through the valve body and formed with a valve element seat facing toward the air inlet, the valve body being configured so that axial displacement of the valve body in the valve housing enables the ducts to be opened at least in sections to allow air to flow past the valve body; and
    a valve element arranged displaceably in the stepped cylindrical breakthrough of the valve body and configured for sealing engagement with the valve element seat;
    a first spring that biases the valve element in the valve body toward the air outlet and into a position for sealing the valve element seat; and
    a second spring between an end wall of the valve housing and the shoulder of the valve body, the second spring surrounding at least part of the valve body and biasing the valve body in the valve housing toward the valve body seat;

wherein an air pressure applied to the air inlet and exerting forces greater than the second spring can lift the valve body off the valve body seat of the valve housing to allow air to flow past the valve body to the air outlet and wherein an air pressure applied to the air outlet and exerting forces greater than the first spring can lift the valve element off a valve element seat of the valve body to allow air to flow past the valve element to the air inlet.

15. The residual pressure holding valve of claim 14, wherein the valve element is a ball and wherein the valve element seat has a concave hemispherical shape.

16. The residual pressure holding valve of claim 15, wherein the valve body is lifted off the valve body seat of the valve housing when an air pressure above a predetermined valve body threshold value is applied to the air inlet, and when an air inlet pressure applied to the air inlet is higher than an air outlet pressure applied to the air outlet.

17. The residual pressure holding valve of claim 16, wherein the valve element is lifted from the valve element seat of the valve body when an air pressure above a predetermined valve element threshold value is applied to the air outlet and when an air outlet pressure applied to the air outlet is higher than an air inlet pressure applied to the air inlet.

18. The residual pressure holding valve of claim 15, wherein the springs are arranged coaxially with respect to one another and the spring forces of the springs acting in opposite directions.

\* \* \* \* \*